3,787,380
Patented Jan. 22, 1974

3,787,380
POLYMERS OF N-VINYL OR N-ALLYL HETERO-CYCLIC COMPOUNDS WITH MONOETHYL-ENICALLY UNSATURATED ESTERS AND GLYCIDYL ESTERS
Paul Stamberger, Baltimore, Md., assignor to Union Optics Corporation, Verona, Pa.
No Drawing. Filed Oct. 5, 1971, Ser. No. 187,131
Int. Cl. C08f 17/00, 19/00
U.S. Cl. 260—80.72         22 Claims

ABSTRACT OF THE DISCLOSURE

Water insoluble but water swellable polymer comprising certain N-vinyl or N-allyl heterocyclic compounds; an unsaturated ester; and glycidyl methacrylate, and/or glycidyl acrylate and/or glycidyl crotonate. The polymer may be swelled in aqueous solutions to provide a transparent hydrogel having excellent physical and optical properties, and suitable in an ophthalmic lens.

BACKGROUND OF THE INVENTION

The present invention is related to novel polymers which are water insoluble but are water swellable to form hydrogels which are transparent and which have excellent physical and optical properties. More particularly, this invention is related to shape retaining transparent articles obtained from such hydrogels and more particularly ophthalmic lenses such as contact lenses.

Recently considerable attention has been directed to obtaining polymers which are suitable to prepare hydrogels and particularly those hydrogels useful as contact lenses.

For example, U.S. Pat. 3,532,679 to Steckler discloses hydrogel materials, which according to the patentee, form suitable contact lenses. Such hydrogels are obtained from a heterocyclic N-vinyl monomer containing a carbonyl functionality adjacent to the nitrogen in the heterocyclic ring such as N-vinyl-2-pyrrolidone, a vinyl ester or an acrylate ester, and a polyethylene glycol dimethacrylate cross-linking agent. According to Steckler, it is necessary to employ a polyethylene dimethacrylate cross-linking agent in order to obtain hydrogels which have properties suitable for use as a contact lens. Moreover, Steckler indicates that much of the previous work with respect to hydrogels suitable for contact lenses was done employing either ethylene glycol dimethacrylate or polyethylene glycol dimethacrylate cross-linking agents. For instance, U.S. Pats. 2,976,576 and 3,220,960 to Otto Wichterle et al. and an article by M. F. Refojo et al. in the Journal of Applied Polymer Science, vol. 9 pp. 2425–35 (1965) describe various hydrogel polymers including those employing an ethylene glycol dimethacrylate cross-linking agent for producing a hydrogel.

It has been found according to the present invention, however, that it is not necessary to employ a polyethylene glycol dimethacrylate or similar material in polymers of certain heterocyclic nitrogen containing compounds in order to obtain hydrogels possessing those properties necessary to prepare acceptable ophthalmic lenses. The present invention therefore provides novel copolymers obtained from certain heterocyclic nitrogen-containing monomers; monoethylenically unsaturated esters; and certain novel hydrogel producing comonomers.

BRIEF DESCRIPTION OF INVENTION

The present invention is concerned with water insoluble but water swellable copolymers of a monomer mixture comprising:

(A) from about 50 to about 90% by weight of a heterocyclic N-vinyl monomer containing a carbonyl functionality adjacent to the nitrogen in the heterocyclic ring and/or a heterocyclic N-allyl monomer containing a carbonyl functionality adjacent to the nitrogen in the heterocyclic ring;
(B) from about 5 to about 40% by weight of an alkyl methacrylate and/or an alkyl acrylate wherein the alkyl group contains from 1 to 22 carbon atoms, and/or a vinyl ester of a saturated monocarboxylic acid having up to 22 carbon atoms; and
(C) from about 0.5 to about 30% by weight of glycidyl methacrylate and/or glycidyl acrylate and/or glycidyl crotonate; and hydrogels obtained therefrom.

DESCRIPTION OF PREFERRED EMBODIMENTS

The heterocyclic monomers which are suitable in obtaining the polymers of the present invention must be water soluble and must contain a carbonyl functionality adjacent to the nitrogen in the heterocyclic ring. In addition, such monomers must contain a vinyl or an allyl group bonded to a nitrogen atom of the heterocyclic ring. Also, the heterocyclic monomer should be capable of homopolymerizing to a water soluble material.

Examples of some suitable heterocyclic monomers containing a carbonyl functionality adjacent to the nitrogen in the heterocyclic ring and containing a vinyl or allyl group pendent from a nitrogen in the heterocyclic ring include the lactams such as N-vinyl-2-pyrrolidone, N-vinyl-2-piperidone, N-vinyl-e-caprolactam and the corresponding allyl derivatives of such lactams. In addition, the various lactams may be substituted in the lactam ring by one or more lower alkyl groups such as methyl, ethyl, or propyl. Other heterocyclic monomers which can be employed in the present invention include N-vinyl imidazolidone, N-vinyl succinimide, N-vinyl diglycorylimide, N-vinyl glutarimide, N-vinyl-3-morpholinone, N-vinyl - 5-methyl-3-morpholinone, and the corresponding allyl derivatives of such materials. It is understood of course that mixtures of such heterocyclic compounds can be employed in preparing the water swellable polymers of the present invention.

The preferred heterocyclic compounds employed are the N-vinyl lactams of which N-vinyl-2-pyrrolidone is the most preferred.

The amount of the heterocyclic compound employed in the monomeric mixture to prepare the polymers of the present invention is usually from about 50 to about 90% and preferably from about 60 to about 80% by weight. Polymers of monomeric mixtures containing from about 60 to about 70% by weight of the heterocyclic compound exhibit an excellent combination of physical and chemical properties.

The monoethylenically unsaturated esters which may be employed in preparing the polymers of the present invention include the alkyl methacrylates, the alkyl acrylates, the vinyl esters of saturated monocarboxylic acids, and mixtures thereof.

Usually the alkyl radical of the methacrylate or acrylate contains up to 22 carbon atoms, and preferably contains from 1 to 5 carbon atoms. Some examples of methacrylates suitable for use in the present invention include methyl methacrylate, ethyl methacrylate, isopropyl methacrylate, butyl methacrylate, capryl methacrylate, palmityl methacrylate, stearyl methacrylate, and lauryl methacrylate. Some suitable acrylate esters include ethyl acrylate, methyl acrylate, isopropyl acrylate, butyl acrylate, and lauryl acrylate.

The vinyl esters suitable in the present invention include the vinyl esters of monocarboxylic acids wherein the acid contains up to about 22 carbon atoms. Some suitable vinyl esters include vinyl acetate, vinyl propionate, vinyl butyrate, vinyl, stearate, and the vinyl ester of "Versatic" 911 acid which is a saturated synthetic tertiary monocarboxylic acid having $C_9$, $C_{10}$ and $C_{11}$ chain length. The most preferred vinyl ester is vinyl acetate.

The preferred unsaturated esters employed in the present invention are the methacrylates of which the most preferred is methyl methacrylate. In addition, it has been found very advantageous in certain instances to employ mixtures of a vinyl ester such as vinyl acetate with the acrylate and/or methacrylate ester. The amount of unsaturated ester employed is usually between about 5 and about 40% by weight, and preferably between about 25 and about 35% by weight. The most preferred quantities of the unsaturated ester are between about 25 and 30% by weight.

The other necessary monomer employed in preparing the polymers of the present invention are the glycidyl esters of either methacrylic acid, acrylic acid, or crotonic acid. The most preferred glycidyl ester is glycidyl methacrylate. The amount of glycidyl ester employed is usually between about 0.5 to about 30%, and preferably between about 2.5 and about 15% by weight. The most preferred quantity of glycidyl ester is between about 4 and about 12% by weight.

The above quantities of the heterocyclic compound, unsaturated ester and glycidyl ester are based upon the combined weight of these materials in the monomer mixture but not necessarily upon the total weight of polymerizable materials since other monomers can be present as will be discussed hereinbelow.

It was surprisingly discovered according to the present invention that the glycidyl ester produces a water insoluble but water swellable material and that when employed it is not necessary to use the polyethylene glycol dimethacrylates which are disclosed by Steckler in U.S. Pat. 3,532,679 as being essential for obtaining hydrogels from polymers of the heterocyclic monomers employed in the polymers of this invention. Moreover, Steckler indicates that the glycidyl methacrylate in heterocyclic terpolymers performs the same function as other unsaturated esters such as the alkyl acrylates, methacrylates and vinyl esters. Table 1 on columns 5 and 6 of U.S. Pat. 3,532,679 clearly shows that the use of the glycidyl methacrylate in such a copolymer gave properties essentially the same as copolymers containing various alkyl methacrylates and alkyl acrylates. Accordingly, it is apparent from the disclosure of Steckler that the polyethylene glycol dimethacrylate is necessary in the copolymers and that the glycidyl methacrylate does not perform any cross-linking function therein and could not be employed in place of the dimethacrylate. This is further substantiated in the article entitled "Glyceryl Methacrylate Hydrogels" by M. F. Refojo in the Journal of Applied Polymer Chemistry, vol. 9, pp. 3161–70 (1965). In particular, pp. 3165 and 3168 of that article indicate that the presence of glycidyl methacrylate in preparing hydrogel copolymers of glyceryl methacrylate decreases the number of crosslinks in the copolymer and subsequently increases the amount of water in the hydrogel.

The following statements by Refojo in that article are believed to be relevant to this discussion:

"The presence of glycidyl methacrylate in the copolymer seems to decrease the number of crosslinks in the network, subsequently increasing the amount of water in the hydrogel.

"As it is well known for gel systems, the amount of liquid found on swelling glyceryl methacrylate hydrogels is inversely proportional to the extent of crosslinking in the network (FIG. 2). Nevertheless, residual glycidyl methacrylate in the glyceryl methacrylate does not seem to be the cause of network formation, since the addition of glycidyl methacrylate to aqueous solutions of glyceryl methacrylate and polymerization of the mixtures thereof yielded hydrogels which at equilibrium held even more water than the gels prepared under the same conditions but without the addition of glycidyl methacrylate. . . ."

Accordingly, it was quite unexpected that the glycidyl esters of the present invention could be employed to produce water insoluble polymers of the present case and that it was not necessary to employ a polyethylene glycol dimethacrylate cross-linking agent to obtain polymers suitable for hydrogel formation.

In addition, it was surprisingly found that copolymers prepared from the above-described monomers contain all those properties which are crucial in manufacture of ophthalmic lenses such as contact lenses. To find suitable polymers is quite difficult since there are numerous properties which must be satisfied before a material can be utilized as a contact lens. However, it has been found that the polymers of the present invention do possess those qualities which are necessary for hydrogel contact lenses. Hydrogels obtained from water swellable polymers of the present invention when swollen have very good optical qualities and high strength characteristics, and are transparent.

The hydrogels obtained from the polymers of the present invention contain from about 10 to about 90% by weight of an aqueous liquid, and preferably contain from about 30 to about 70% by weight of an aqueous liquid. In addition, hydrogels can be obtained by swelling the polymers of the present invention with water soluble swelling agents instead of aqueous solutions. Some examples of water soluble swelling agents include ethylene glycol, the liquid polyethylene glycols, the glycol esters of lactic acid, formamide, dimethyl formamide, dimethyl sulfoxide, and the like. Accordingly, the term "hydrogel" as used herein includes polymers which are swelled with water soluble swelling agents as well as those swelled with aqueous solutions. However, when the hydrogel is to be employed as a contact lens, it will be necessary to replace any water soluble liquid with the aqueous solution. The hydrogel contact lens should of course contain a physiological saline solution as the aqueous medium. This is in order to provide a contact lens which is in a state of osmotic equilibrium with physiological saline solution.

The polymers of the present invention are preferably prepared employing bulk polymerization techniques. The term "bulk polymerization" as used herein includes those polymerizations carried out in the absence of a solvent or dispersing liquid as well as those polymerizations carried out in the presence of water or water soluble or polymer soluble liquid swelling agents in such amounts as not to significantly alter the nature of the polymerization process. For example, the amount of water or other swelling agent for the polymerization to be a bulk polymerization is less than the quantity of such material which is necessary to dissolve or disperse the monomers thereby providing the monomers with a freedom of movement which changes the nature and mechanism of the polymerization.

The polymerization catalyst employed can be any of the catalysts which are suitable in polymerizing compounds containing ethylenic unsaturation, and preferably are the free radical catalysts. Of particular interest are the peroxide catalysts and azo type catalyst such as azobisisobutyronitrile. Some examples of suitable peroxide catalysts include hydrogen peroxide, benzoyl peroxide, tert-butyl peroctoate, phthalic peroxide, succinic peroxide, benzoyl acetic peroxide, coconut oil acid peroxide, lauric peroxide, stearic peroxide, oleic peroxide, tert-butyl hydroperoxide, tetraline hydroperoxide, tert-butyl diperphthalate, cumene hydroperoxide, tert-butyl perbenzoate, acetyl peroxide, 2,4-dichlorobenzoyl peroxide, urea peroxide, caprylyl peroxide, p-chlorobenzoyl peroxide, di-tert-butyl peroxide, 2,2-bis(tert-butyl peroxy)butane, hydroxyheptyl peroxide, the diperoxide of benzaldehyde, and the like. The preferred catalyst is one which is effective at moderately low temperatures such as at about 50–70° C., such as tert-butyl peroctoate.

In addition to the free radical polymerization catalyst the catalyst can include those materials which accelerate polymerization primarily by opening of the epoxide group of the glycidyl ester. Such catalysts include p-toluene sulfonic acid, sulfuric acid, phosphoric acid, aluminum chloride, stannic chloride, ferric chloride, boron trifluoride, boron trifluoride-ethyl ether complex, and iodine. It may be desirable to employ a multistage polymerization process. For instance, the polymerization can initially be conducted until substantially all of the unsaturated grouping have polymerized, and then can be conducted to effect polymerization through the breaking of the oxirane group of the glycidyl ester and condensation.

The amount of catalyst employed depends upon the type catalyst system used and is generally from about 0.01 to about 10 parts by weight per 100 parts of the monomer mixture, and preferably is from about 0.1 to about 1 part by weight per 100 parts of the monomer mixture.

The polymerization is generally carried out at temperatures from about room temperature to about 150° C. It is generally preferred to initiate the polymerization at relatively low temperatures such as from about 35 to about 85° C., and then to increase the temperature to about 90 to about 150° C. as the reaction proceeds and preferably after most of the reaction has been completed. The most preferred initial temperature range of polymerization is between about 50 and 80° C.

Usually the polymerization is conducted under autogenous pressure in a closed reaction vessel. However, any suitable means to prevent significant evaporation of any of the monomers can be employed.

Generally, the polymerization is completed in about 4 to about 24 hours and preferably is completed in about 6 to 18 hours. It is understood, of course, that the time and temperature are inversely related. That is, temperatures employed at the upper end of the temperature range will provide polymerization processes which can be completed near the lower end of the time range.

In addition, it may be desirable for the copolymers obtained from such polymerizations to be post cured at temperatures somewhat higher than those initially employed in the polymerization. Usually the temperatures employed in the post cure will range from about 90° to about 150° C. Five hours is usually more than sufficient for such a post curing operation. Preferably the post cure is completed in one or two hours.

After the polymerization is completed and usually after suitable shaping or machining operations, and after any water soluble impurities are leached out, the polymer can then be contacted with a suitable liquid in order to obtain the hydrogel materials which can then be employed as ophthalmic lenses.

The polymerization and post curing, if employed, may be carried out in a mold or cast conforming to the general or exact shape and/or size of the desired product. After the polymer is completed, including any post curing, a firm, rigid, and clear copolymer is obtained. The polymers of the present invention possess other important characteristics such as having excellent machineability and polishing characteristics. This material, if necessary, can then be further fabricated into various sizes and shapes or cut into the exact shape and size of a desired product. The fabricated product can then be swelled in a suitable liquid until equilibrium is reached or until a hydrogen containing the desired amount of liquid such as aqueous liquid is reached.

The hydrogels which can be obtained from the polymers of the present invention are clear and exhibit good tear resistance. Also the hydrogels may be elastic and flexible or may be rigid depending upon the relative amounts and specific comonomers used. Moreover, they possess the necessary optical properties essential for ophthalmic devices.

The inclusion of other copolymerizable ethylenically unsaturated monomers in such amounts which do not drastically alter the properties of the polymers of the present invention is intended to come within the scope of the present invention. Such other monomers include hydroxy alkyl acrylates, hydroxy alkyl methacrylates, methacrylates and/or acrylates of amino alcohols. Some specific monomers which can be present in the present invention include hydroxy ethyl methacrylate, hydroxy ethyl acrylate, hydroxy propyl methacrylate, other suitable monomers include diethylene glycol monoacrylate, acrylamide, methacrylamide, the monovinyl and monoallyl esters of polycarboxylic hydroxy acids such as tartaric acid, malic acid, or citric acid; allyl ethers of polyhydric sugars such as sorbitol or mannitol; and glycol monoesters of olefinic acids such as itaconic acid and maleic acid.

In order to better understand the present invention, the following examples are given wherein all parts are by weight unless the contrary is stated:

Example 1

63 parts of N-vinyl-2-pyrrolidone, 29 parts of methyl methacrylate, 9 parts of glycidyl methacrylate are admixed with 0.4 parts of tert-butyl peroctoate catalyst. The polymerization mixture is then poured into individual polypropylene stationary circular molds of ¾ inch inside diameter and ⅜ inch depth.

The polymerization of the material is effected by initially heating the mixture to about 50–55° C. for 10 hours. The polymerization is then completed by heating for 1 hour at 90° C. and then heating for another hour at 120° C. After the polymerization is completed, a clear, firm, and rigid copolymer is obtained. The polymerized material is then placed on a conventional contact lens lathe such as one obtainable from Hardinge Brothers, Elmira, N.Y., and then is ground and polished. The copolymer has excellent maching and polishing characteristics. It is then contacted with physiological saline solution until it is in the state of osmotic equilibrium with the physiological saline solution to produce the desired hydrogel contact lens.

The hydrogel lens obtained is clear, flexible, and elastic, has excellent optical properties, and has a water content of 61.3% at osmotic equilibrium.

Example 2

Example 1 is repeated except that the amount of glycidyl methacrylate is 6 parts. The results obtained are similar to those of Example 1 except that the hydrogel at osmotic equilibrium has a water content of about 61.5%.

Example 3

70 parts of N-vinyl-2-pyrrolidone, 30 parts of methyl methacrylate, 0.6 part of glycidyl methacrylate are admixed with 0.4 parts of tert-butyl peroctoate catalyst. The polymerization mixture is then poured into individual polypropylene stationary circular molds of ¾ inch inside diameter and ⅜ inch depth.

The polymerization of the material is effected by initially heating the mixture to about 50–55° C. for 10 hours. The polymerization is then completed by heating for 1 hour at 90° C. and then heating for another hour at 120° C. After the polymerization is completed, a clear, firm, and rigid copolymer is obtained. The polymerized material is then processed according to the method described in Example 1 to produce a hydrogel contact lens.

The hydrogel lens obtained is clear, flexible, and elastic, has excellent optical properties, and has a water content of about 80.8% at osmotic equilibrium.

Example 4

Example 3 is repeated except that the amount of glyridyl methacrylate is 1.25 parts. The results obtained are similar to those of Example 3 except that the hydrogel at osmotic equilibrium has a water content of about 73%.

Example 5

66.5 parts of N-vinyl-2-pyrrolidone, 28.6 parts of methyl methacrylate, 4.85 parts of glycidyl methacrylate are admixed with 0.4 part of tert-butyl peroctoate catalyst. The polymerization mixture is then poured into individual polypropylene stationary circular molds of ¾ inch inside diameter and ⅜ inch depth.

The polymerization of the material is effected by initially heating the mixture to about 50–55° C. for 10 hours. The polymerization is then completed by heating for 1 hour at 90° C. and then heating for another hour at 120° C. After the polymerization is completed, a clear, firm, and rigid copolymer is obtained. The polymerized material is then processed according to the method described in Example 1 to produce a hydrogel contact lens.

The hydrogel lens obtained is clear, flexible and elastic, has excellent optical properties and has a water content of about 66.1% at osmotic equilibrium.

Example 6

63 parts of N-vinyl-2-pyrrolidone, 27 parts of methyl methacrylate, 6 parts of glycidyl methacrylate are admixed with 0.4 parts of tert-butyl peroctoate catalyst. The polymerization mixture is then poured into individual polypropylene stationary circular molds of ¾ inch inside diameter and ⅜ inch depth.

The polymerization of the material is effected by initially heating the mixture to about 50–55° C. for 10 hours. The polymerization is then completed by heating for 1 hour at 90° C. and then heating for another hour at 120° C. After the polymerization is completed, a clear, firm, and rigid copolymer is obtained. The polymerized material is then processed according to the method described in Example 1 to produce a hydrogel contact lens.

The hydrogel lens obtained is transparent, flexible, and elastic, has good optical properties, has a slight haze, and has a water content of about 65.5% at osmotic equilibrium.

Example 7

63 parts of N-vinyl-2-pyrrolidone, 30 parts of methyl methacrylate, 9 parts of glycidyl methacrylate and 4 parts of hydroxy ethyl methacrylate are admixed with 0.4 part of tert-butyl peroctoate catalyst. The polymerization mixture is then poured into individual polypropylene stationary circular molds of ¾ inch inside diameter and ⅜ inch depth.

The polymerization of the material is effected by initially heating the mixture to about 55–58° C. for 16 hours. The polymerization is then completed by heating for 2 hours at 110° C. After the polymerization is completed, a clear, firm, and rigid copolymer is obtained. The polymerized material is then processed according to the method described in Example 1 to produce a hydrogel contact lens.

The hydrogel lens obtained is clear, flexible, and elastic, has excellent optical properties and has a water content of about 65.8% at osmotic equilibrium.

Example 8

70 parts of N-vinyl-2-pyrrolidone, 20 parts of methyl methacrylate, 10 parts of vinyl acetate, and 10 parts of glycidyl methacrylate are admixed with 0.6 part of tert-butyl peroctoate catalyst. The polymerization mixture is then poured into individual polypropylene stationary circular molds of ¾ inch inside diameter and ⅜ inch depth.

The polymerization is effected by initially heating the mixture to 80° C. for 16 hours. The polymerization is then completed by heating for 2 hours at 95° C. After the polymerization is completed, a clear, rigid, and firm copolymer is obtained. The polymerized material is then processed according to the method described in Example 1 to produce a hydrogel contact lens.

The hydrogel lens obtained is clear, flexible, and elastic, has excellent optical properties, and has a water content of about 68.7%.

Example 9

70 parts of N-vinyl-2-pyrrolidone, 30 parts of vinyl acetate, and 10 parts of glycidyl methacrylate are admixed with 0.6 part of tert-butyl peroctoate catalyst. The polymerization mixture is then poured into individual polypropylene stationary circular molds of ¾ inch inside diameter and ⅜ inch depth.

The polymerization of the materials is effected by initially heating the mixture at about 80° C. for about 16 hours. The polymerization is then completed by heating for 2 hours at 95° C. After the polymerization is completed a clear, firm, and rigid copolymer is obtained. The polymerized material is then processed according to the procedure set forth in Example 1 to produce a hydrogel contact lens.

The hydrogel lens obtained is clear, flexible, and elastic, has excellent optical properties, and has a water content of about 83.2% at osmotic equilibrium.

Example 10

31.5 parts of N-vinyl-2-pyrrolidone, 7.5 parts of ethyl methacrylate, 7.5 parts of methyl methacrylate, and 9 parts of glycidyl methacrylate are admixed with 0.2 part of tert-butyl peroctoate. The polymerization mixture is then poured into individual polypropylene stationary circular molds of ¾ inch inside diameter and ⅜ inch depth.

The polymerization of the material is effected by heating the mixture to 56° C. for 16 hours. The polymerization is then completed by heating for one hour at 90° C. and then heating for another hour at 120°. The polymerized material is then processed according to the procedure set forth in Example 1 to produce a hydrogel contact lens.

The hydrogel contact lens obtained is clear, flexible, and elastic, has excellent optical properties and has a water content of about 63.5% at osmotic equilibrium.

Comparison Example 11

90 parts of N-vinyl-2-pyrrolidone and 10 parts of glycidyl methacrylate are admixed with 0.4 part of tert-butyl peroctoate catalyst. The polymerization mixture is then poured into individual polypropylene stationary circular molds of ¾ inch inside diameter and ⅜ inch depth.

The polymerization of the material is effected by initially heating the mixture to about 50–55° C. for 10 hours. The material is then post cured to heating for 1 hour at 90° C. and then heating for another hour at 120° C.

The polymerized material when contacted with physiological saline solution until it is in the state of osmotic equilibrium with the saline solution swells to a very weak hydrogel which breaks upon handling, and therefore is unsuitable for use as a lens.

Comparison Example 12

Example 11 is repeated except that the amount of glycidyl methacrylate is 15 parts and the amount of vinyl pyrrolidone is 85 parts. The results obtained are similar to Example 8.

A comparison of Examples 1–10 with Examples 11 and 12 clearly demonstrates the efficacy of the materials of the present invention as compared to those outside the scope of the invention.

What is claimed is:

1. A water insoluble but water swellable copolymer of a monomer mixture comprising:
    (A) heterocyclic polymerizable compound containing a carbonyl functionality adjacent to the nitrogen in the heterocyclic ring and being selected from the group consisting of N-vinyl lactams, N-vinyl imidazolidone, N-vinyl succinimide, N-vinyl diglycolylimide, N-vinyl glutarimide, N-vinyl-3-morpholinone, N-vinyl-5-methyl-3-morpholinone, and mixtures thereof;
    (B) monoethylenically unsaturated esters selected from the group consisting of alkyl acrylates, alkyl methacrylates, vinyl esters of saturated monocarboxylic acids of up to 22 carbon atoms, and mixtures thereof, wherein the alkyl group of said methacrylate or acrylate contains from 1 to 22 carbon atoms; and
    (C) glycidyl esters selected from the group consisting of glycidyl methacrylate, glycidyl acrylate, glycidyl crotonate, and mixtures thereof; and wherein said monomer mixture contains from about 50 to about 90% by weight of (A), from about 5 to about 40% by weight of (B) and from about 0.5 to about 30% by weight of (C) based upon the combined weight of (A), (B), and (C) in said monomer mixture.

2. The copolymer of claim 1 wherein said heterocyclic polymerizable compound is a N-vinyl lactam.

3. The copolymer of claim 1 wherein said heterocyclic polymerizable compound is N-vinyl-2-pyrrolidone.

4. The copolymer of claim 1 wherein said monoethylenically unsaturated ester is an alkyl methacrylate.

5. The copolymer of claim 4 wherein said alkyl methacrylate is methyl methacrylate.

6. The copolymer of claim 1 wherein said glycidyl ester is glycidyl methacrylate.

7. The copolymer of claim 1 wherein said heterocyclic polymerizable compound is employed in an amount of about 60 to about 70% by weight based upon the combined weight of (A), (B), and (C).

8. The copolymer of claim 1 wherein said monoethylenically unsaturated ester is employed in an amount of between about 25 and about 35% by weight based upon the combined weight of (A), (B), and (C).

9. The copolymer of claim 1 wherein said glycidyl ester is employed in an amount between about 2.5 and about 15% by weight based upon the combined weight of (A), (B), and (C).

10. The copolymer of claim 1 wherein said monomeric mixture comprises based upon the combined weight of (A), (B), and (C) from about 60 to about 70% by weight of N-vinyl-2-pyrrolidone; from about 25 to about 30% by weight of methyl methacrylate; and from about 4 to about 12% by weight of glycidyl methacrylate.

11. The copolymer of claim 1 wherein said monoethylenically unsaturated ester is a mixture of a vinyl ester and an alkyl methacrylate.

12. The copolymer of claim 11 wherein said vinyl ester is vinyl acetate and said alkyl methacrylate is methyl methacrylate.

13. The copolymer of claim 1 wherein said monoethylenically unsaturated ester is a vinyl ester.

14. The copolymer of claim 13 wherein said vinyl ester is vinyl acetate.

15. The copolymer of claim 1 which is a bulk polymerized copolymer.

16. The copolymer of claim 1 wherein said heterocyclic polymerizable compound is selected from the group consisting of N-vinyl-2-pyrrolidone, N-vinyl-2-piperidone, N-vinyl-3-caprolactam, N-vinyl-imidazolidone, N-vinyl-succinimide, N-vinyl-diglycolylimide, N-vinyl-glutarimide, N-vinyl-3-morpholinone, N-vinyl-5-methyl-3-morpholinone, and mixtures thereof.

17. The copolymer of claim 1 wherein said monoethylenically unsaturated ester is selected from the group of alkyl acrylates, alkyl methacrylates, and mixtures thereof, wherein the alkyl group of said methacrylate or acrylate contains from 1 to 22 carbon atoms.

18. The copolymer of claim 17 wherein the alkyl group of said methacrylate or acrylate contains from 1 to 5 carbon atoms.

19. The copolymer of claim 17 wherein said heterocyclic polymerizable compound is selected from the group consisting of N-vinyl-2-pyrrolidone, N-vinyl-2-piperidone, N-vinyl-3-caprolactam, N-vinyl-imidazolidone, N-vinyl-succinimide, N-vinyl-diglycolylimide, N-vinyl-glutarimide, N-vinyl-3-morpholinone, N - vinyl-5-methyl-3-morpholinone, and mixtures thereof.

20. The copolymer of claim 1 wherein said monomer mixture contains from about 60 to about 80% by weight of (A), from about 25 to about 35% by weight of (B), and from about 2.5 to about 15% by weight of (C) based upon the combined weight of (A), (B), and (C) in said monomer mixture.

21. The copolymer of claim 1 wherein said monomer mixture contains from about 60 to about 70% by weight of (A), from about 25 to about 30% by weight of (B), and from about 4 to about 12% by weight of (C) based upon the combined weight of (A), (B), and (C) in said monomer mixture.

22. The copolymer of claim 17 which is a bulk polymerized copolymer.

References Cited
UNITED STATES PATENTS

| | | | |
|---|---|---|---|
| 3,405,084 | 10/1968 | Bohac et al. | 260—29.61 A |
| 3,532,679 | 10/1970 | Steckler | 260—80.72 |
| 3,617,165 | 11/1971 | Kalopissis | 260—80.72 X |
| 3,689,439 | 9/1972 | Field et al. | 260—2.5 N |
| 3,691,125 | 9/1972 | Barabas et al. | 260—29.6 RW |
| 3,720,653 | 3/1973 | Kalopissis et al. | 260—80.72 |

LUCILLE M. PHYNES, Primary Examiner

U.S. Cl. X.R.

260—29.6 TA, 80.81; 351—160